(12) United States Patent
Sharp et al.

(10) Patent No.: US 11,703,622 B2
(45) Date of Patent: Jul. 18, 2023

(54) POLARIZATION-BASED FILTERS WITH ANGLE-SENSITIVE TRANSMISSION HAVING CIRCULAR POLARIZERS

(71) Applicant: META PLATFORMS TECHNOLOGIES, LLC, Menlo Park, CA (US)

(72) Inventors: Gary D. Sharp, Boulder, CO (US); Anthony D. McGettigan, Santa Rosa, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 696 days.

(21) Appl. No.: 16/600,471

(22) Filed: Oct. 12, 2019

(65) Prior Publication Data

US 2020/0116912 A1  Apr. 16, 2020

Related U.S. Application Data

(60) Provisional application No. 62/745,060, filed on Oct. 12, 2018.

(51) Int. Cl.
*G02F 1/1335* (2006.01)
*G02B 5/30* (2006.01)
*G02B 27/28* (2006.01)

(52) U.S. Cl.
CPC .......... *G02B 5/3083* (2013.01); *G02B 5/3066* (2013.01); *G02F 1/133528* (2013.01); *G02B 27/286* (2013.01); *G02F 1/133541* (2021.01)

(58) Field of Classification Search
CPC .............. G02B 5/20; G02B 5/30–3091; G02B 27/28–288; G02F 1/133509;
(Continued)

(56) References Cited

U.S. PATENT DOCUMENTS 3,498,132 A * 3/1970 Smith ........................ G01J 1/00
250/338.5
2003/0107809 A1 * 6/2003 Chen .................... G02B 27/288
353/20

(Continued)

FOREIGN PATENT DOCUMENTS

CN 1646975 A 7/2005
CN 1650197 A 8/2005
(Continued)

OTHER PUBLICATIONS

European Search Report for European Patent Application No. 19871620.1, dated Aug. 12, 2022, 7 pages.
(Continued)

*Primary Examiner* — Ryan S Dunning
(74) *Attorney, Agent, or Firm* — Greenberg Traurig, LLP

(57) ABSTRACT

Polarization-based optical angle-filters disclosed herein can be engineered to transmit a prescribed amount of light as a function of incidence angle and azimuth. Such filters can transmit light without introducing artifacts, making them suitable for the image-path of an optical system. One example may include an angle-filter having an input circular polarizer, an analyzing circular polarizer, and a retarder positioned between the circular polarizers, the retarder having a thickness-direction retardation. The thickness-direction retardation of the retarder ($R_{th}$) is selected to produce a prescribed angle-of-incidence dependent transmission function, and the circular polarizers reduce the amount of azimuth-dependence in the transmission function.

30 Claims, 17 Drawing Sheets

(58) Field of Classification Search
CPC ........ G02F 1/133524; G02F 1/133528–13355; G02F 1/13362; G02F 1/13363–133638; G02F 2413/00–15
See application file for complete search history.

(56) References Cited

U.S. PATENT DOCUMENTS

| | | | |
|---|---|---|---|
| 2004/0233362 A1* | 11/2004 | Kashima | G02F 1/1323 349/117 |
| 2005/0151896 A1 | 7/2005 | Hara et al. | |
| 2005/0180017 A1 | 8/2005 | Hara et al. | |
| 2006/0056029 A1 | 3/2006 | Ye | |
| 2006/0238867 A1* | 10/2006 | Takeda | G02B 27/288 359/485.02 |
| 2007/0008460 A1 | 1/2007 | Takeda et al. | |
| 2007/0081261 A1* | 4/2007 | Gebelein | G02B 23/125 359/812 |
| 2007/0236629 A1* | 10/2007 | Wu | G02F 1/133555 349/114 |
| 2009/0034070 A1 | 2/2009 | Hara et al. | |
| 2009/0161044 A1* | 6/2009 | Ge | G02F 1/133555 349/98 |
| 2010/0226007 A1 | 9/2010 | Hara et al. | |
| 2013/0083276 A1* | 4/2013 | Iwahashi | G03C 1/76 347/110 |
| 2014/0043465 A1* | 2/2014 | Salomonsson | B60Q 1/143 348/113 |
| 2014/0332786 A1* | 11/2014 | Nakazawa | H01L 27/3244 359/489.07 |
| 2016/0011352 A1* | 1/2016 | Saitoh | H01L 27/3232 349/194 |
| 2017/0160452 A1* | 6/2017 | Yasuda | G02B 5/26 |

FOREIGN PATENT DOCUMENTS

| | | |
|---|---|---|
| CN | 1900749 A | 1/2007 |
| CN | 101382618 A | 3/2009 |
| CN | 103765262 A | 4/2014 |
| CN | 104937457 A | 9/2015 |
| EP | 1498751 A1 | 1/2005 |
| EP | 1498768 A1 | 1/2005 |
| JP | 2004004764 A | 1/2004 |
| JP | 2004029743 A | 1/2004 |
| JP | 2004341417 A | 12/2004 |
| KR | 20040097373 A | 11/2004 |
| KR | 20040102166 A | 12/2004 |
| TW | 200306437 A | 11/2003 |
| TW | 200307160 A | 12/2003 |
| WO | 03091766 A1 | 11/2003 |
| WO | 03091794 A1 | 11/2003 |
| WO | 2004104653 A1 | 12/2004 |

OTHER PUBLICATIONS

Office Action dated Mar. 8, 2023 for Chinese Application No. 201980079659.1, filed Oct. 12, 2019, 17 pages.
Office Action dated May 9, 2023 for Japanese Patent Application No. 2021-519798, filed on Oct. 12, 2019, 13 pages.

* cited by examiner

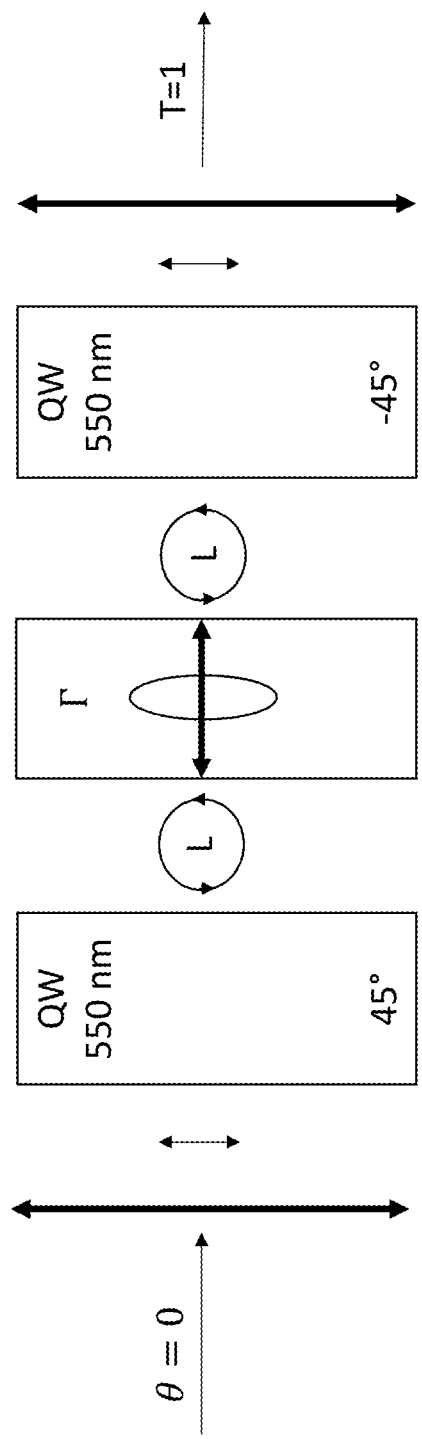
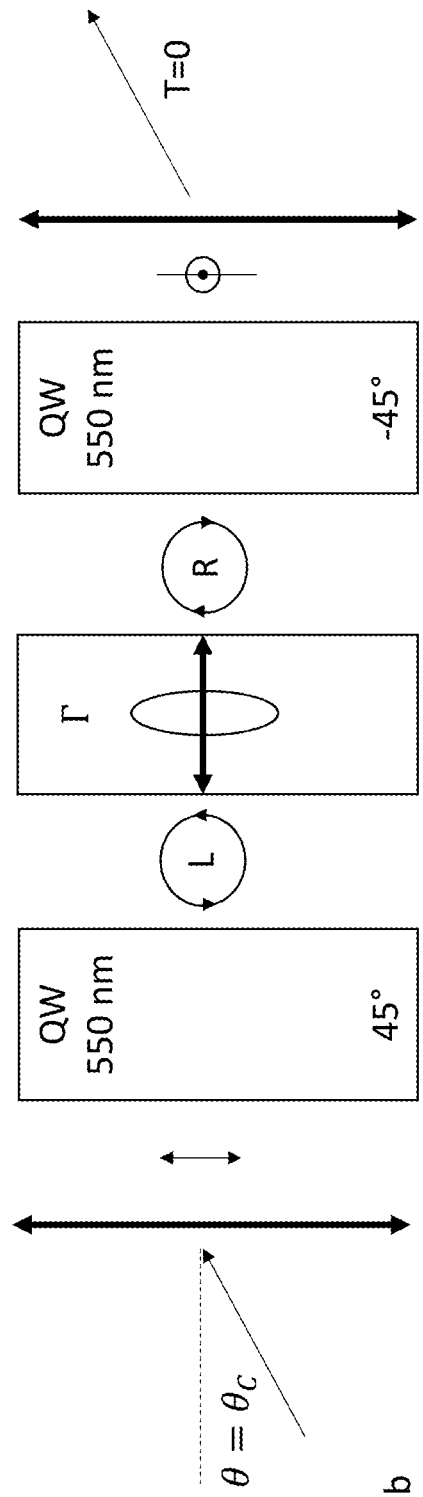
Figure 2a
Figure 2b

POLARIZATION-BASED FILTERS WITH ANGLE-SENSITIVE TRANSMISSION HAVING CIRCULAR POLARIZERS

CROSS-REFERENCE

This application claims priority to U.S. Provisional Application No. 62/745,060 filed Oct. 12, 2018, the contents of which are incorporated herein by reference in its entirety.

BACKGROUND

The performance of certain optical systems can be enhanced by inserting filters at specific locations having a transmission that depends upon angle-of-incidence (angle with respect to surface-normal, and azimuth), and in some instances, depends upon position. Angle-filters can effectively change the radiation pattern of a light source (i.e. intensity in watts/lumens per solid-angle) from (for example) Lambertian-like, to one that is more confined. For instance, prismatic light-control films (e.g., by 3M) can determine which incident ray angles are efficiently transmitted and which are reflected as a function of incidence angle and azimuth. Such filters are particularly useful in an illumination path, where the optical quality required in an image path is of lesser importance.

SUMMARY

Described are polarization-based optical filters engineered to produce a prescribed transmission as a function of ray angle (i.e. angle with respect to normal and azimuth). In some instances, it is beneficial to design a filter that efficiently transmits light within a range of angles near normal-incidence. In some instances, it is beneficial to specify a desired angle-cutoff and angular transition-bandwidth. It may be further required to specify an angular band beyond the transition-band in which the transmission is minimized. In some instances, this cutoff angle is azimuth-dependent, and in other cases it may preferably be insensitive to azimuth. The previous describes an azimuth-invariant low-pass angle-filter. In some instances, the wavelength-dependence of the filter-function is minimized, to give an angle-filter profile that is neutral over (e.g.) the visible band. In others it may be preferred that the angle filtering profile have a specific wavelength dependence. Angle-filters described herein are potentially useful for improving vision (e.g. outdoor eyewear), in display devices, in image capture devices, and in general for improving the performance of imaging systems. They can also improve the performance of radiometric systems by (e.g.) attenuating stray-light while transmitting information-bearing light.

Disclosed herein is an angle-filter that includes an input circular polarizer; an analyzing circular polarizer; and a retarder positioned between the circular polarizers, the retarder having a thickness-direction retardation. The thickness-direction retardation of the retarder ($R_{th}$) is selected to produce a prescribed angle-of-incidence dependent transmission function, and the circular polarizers reduce the amount of azimuth-dependence in the transmission function.

The circular polarizers may each be constructed of a linear-polarizer combined with a quarter-wave retarder. Each of the linear polarizers may be one of an absorptive polarizer, a reflective polarizer, or a crystalline polarizer. The analyzing circular polarizer may be the input circular polarizer flipped about the polarizer axis. The quarter-wave retarders may have reverse-dispersion, such that the optical-pathlength-difference in the red exceeds that in the blue. The quarter-wave retarders may have $R_{th} < R_e/2$, where $R_e$ is the in-plane retardation. The quarter-wave retarders may have $R_{th}=0$. The polarizers may be parallel, and the QW optic-axes may be crossed at $\pm 45°$. The quarter-wave retarders may be one of a stretched polymer, a reactive-mesogen retarder, or a crystalline retarder.

The retarder may be one of a C-Plate, an O-Plate, or a Biaxial retarder. The retarder may have $R_{th}<0$ or $R_{th}>0$. The retarder may be a C-Plate with magnitude $|R_{th}|>400$ nm. The transmission function may be one of a low-pass filter, a band-pass filter, or a high-pass filter. The azimuth variation in a 50% transmission angle may vary by less than $\pm 10\%$. The azimuth variation in a 50% transmission angle may vary by less than $\pm 20\%$. A geometric compensator may be placed between the input linear-polarizer and the quarter-wave retarder, between the analyzing linear-polarizer and quarter-wave retarder, or between both.

A pair of eyewear may contain an angle-filter as described above, wherein the angle-filter has a prescribed angle-dependent transmission function reducing the amount of stray-light. An image-capture device may contain an angle-filter as described above, wherein the angle-filter has a prescribed angle-dependent transmission function for reducing the amount of stray-light. A display device may contain an angle-filter as described above, wherein the angle-filter has a prescribed angle-dependent transmission function for reducing the amount of stray-light reflected by the display, reduces the etendue of the backlight unit, or both. A radiometric system may include an angle-filter as described above placed in a receiver-path, an illumination-path, or both, for the purpose of reducing the etendue.

Also disclosed is a two-stage angle-filter arranged in series including a first stage including a first input circular polarizer; a first analyzing circular polarizer; and a first retarder between the first circular polarizers. The two-stage angle-filter includes a second stage including a second input circular polarizer; a second analyzing circular polarizer; and a second retarder between the second circular polarizers. The thickness-direction retardation of the first retarder ($R_{th}1$) and of the second retarder ($R_{th}2$) are selected to produce a prescribed angle-of-incidence dependent transmission function, and the circular polarizers reduce the amount of azimuth-dependence in the transmission function.

The circular polarizers may be constructed of a linear-polarizer combined with a quarter-wave retarder. The analyzing circular polarizer of the first stage and the input circular polarizer of the second stage may share a common linear polarizer. The polarizers may all be parallel, and the QW optic-axes in the first and second stage may be crossed at $\pm 45°$. The retarders may be one of a C-Plate, an O-Plate, or a Biaxial retarder. The first retarder and the second retarder may be C-Plates with magnitude $|R_{th}|>400$ nm. The transmission function may be one of a low-pass filter, a band-pass filter, or a high-pass filter. The azimuth variation in a 50% transmission angle may vary by less than $\pm 10\%$. The azimuth variation in a 50% transmission angle may vary by less than $\pm 20\%$. A geometric compensator may be placed between the input linear-polarizer and the quarter-wave retarder, the analyzing linear-polarizer and quarter-wave retarder, or both, in one or both stages.

FIGURES

FIG. 2a shows the transmission response of an angle-filter near normal incidence.

FIG. 2b shows the transmission response of an angle filter at the critical cutoff angle $\theta_C$.

DETAILED DESCRIPTION

Figure 1:
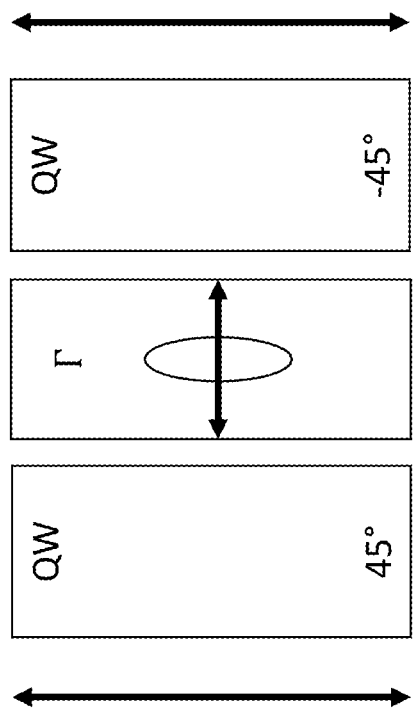
FIG. 1 shows a cross-sectional view of a single-stage angle-filter disclosed herein.

The embodiments shown herein are susceptible to various modifications and alternative forms, specific embodiments thereof have been shown by way of example. It should be understood however, that it is not intended to limit the invention to the particular form disclosed, but rather, the invention is to cover all modifications, equivalents, and alternatives as defined by the claims.

In certain instances, low-pass angle-filters are required that may include the following specifications:

1. High transmission at normal incidence, with minimal fall-off to a prescribed maximum angle.
2. An angle transition-band, often characterized by angular points at which the transmission falls to (e.g.) 90%, 50%, and 10%.
3. An angle rejected band, often characterized by a not-to-exceed transmission, or an average out-of-band transmission. Also included may be a rejection bandwidth, in that there may be an important range of angles over which the transmission cannot exceed a certain value, followed by a "don't-care" bandwidth beyond which the transmission is inconsequential to system performance.
4. It may be necessary to preserve optical quality of a transmitted wave, as for example where the filter resides in an image-path location.
5. There may be specific tolerances on the azimuth-dependence of the above requirements and, in some cases, it may be important that the above has minimal azimuth dependence.
6. There may be specific tolerances on the wavelength-dependence of the above requirements and, in some cases, it may be important that the above has minimal wavelength dependence.
7. The filter may reside in a location where polarization-dependence is unimportant (e.g. an unpolarized input/output), or it may be necessary for the system to accommodate a specific input and output polarization state.

An important element for introducing an angle-of-incidence (AOI)-dependent transmission is a polarization-optic having a refractive index in the thickness direction that is substantially different than the average in-plane refractive index. For instance, a C-Plate (retarder) has an isotropic in-plane refractive index, with a normal-direction refractive index that is either higher or lower than the in-plane refractive index. When a C-Plate is placed between a pair of (e.g. parallel) polarizers, an AOI-dependent transmission profile (depending upon C-Plate pathlength-difference) can be created that is highly azimuth dependent. Because the projected orientation of the C-Plate optic axis (OA) is contained in the plane-of-incidence, a high-contrast transmission minimum may only occur when the projected retardation is half-wave, and the projected OA is at ±45° to the polarizer absorption axes. This means that high-contrast angle-filtering may only occur in four small regions of the contrast polar-plot. The techniques disclosed herein seek to expand the azimuth space over which high-contrast angle filtering can occur. In some instances, the objective is to obtain an azimuth-invariant angle-filter profile.

FIG. 1 shows some basic elements of a single-stage angle filter disclosed herein. A pair of parallel linear polarizers bounds a pair of outer quarter-wave (QW) retarders, which bound a central C-Plate retarder. The ellipse shown in the figure is indicative of a negative C-Plate, though either a positive or negative C-Plate is valid. The retardation of the C-Plate is represented by $\Gamma=2\pi\Delta nd/\lambda$, where $\Delta nd$ is the optical pathlength difference, and $\lambda$ is the incident wavelength. The factor $\Delta n$ is the difference between the in-plane and thickness-direction refractive indexes.

In a more general sense, the C-Plate of disclosed herein is bounded by a pair of circular polarizers. As such, any circular polarizer of the prior art can be used in place of the linear-polarizer QW retarder combination. In FIG. 1, the circular-polarizers disclosed herein can be of identical construction (i.e. the same handedness), where the analyzing CP is identically the input CP flipped about the polarizer absorption-axis. The circular polarizer units disclosed herein have the function of homogenizing the angle-filtering operation, such that what normally may occur in only four polar orientations of azimuth space in their absence, can be spread to a broad range of azimuth angles.

In the single C-Plate configuration described above, the rapid fall-off in contrast with azimuth is dominated by the rotation of the projected OA, coinciding with the POI azimuth. However, it should be noted that the techniques disclosed herein may have an additional geometric-rotation that may require compensation in high-performance configurations. In the simple C-Plate example, this is typically manifested as a small azimuthal rotation in the contrast polar-plot. Though this has relatively little functional impact for the example of a C-Plate between polarizers, it can be a performance limiter in more sophisticated configurations.

Polarization-based angle-filters can be engineered using polarization optics developed for the display and photonics industries. Potentially useful building-blocks include (e.g.) linear sheet polarizers fabricated using stretched poly-vinyl-alcohol films that orient molecules of a dye/iodine solution. Linear polarizers of the reflective type can also be used, such as wire-grid polarizers from Asahi-Kasei, Moxtek, and multi-layer co-extrusion type from 3M. Also, crystal-based polarizers, such as a Glan-Thomson polarizer can be used. It can further include linear retarders fabricated using cast/extruded polycarbonate, cyclic-olefin polymer films and the like, that are heated and stretched to produce a prescribed optical pathlength difference. Uniaxial in-plane stretched films are conventional retarders that produce a phase-difference between two incident waves (Re). It can further include films that are biaxially in-plane stretched to produce a particular in-plane retardation (Re) and a thickness-direction retardation (Rth) which are also known in the art. A subset of this includes C-Plate retarder films that are biaxially stretched to have zero in-plane retardation and a prescribed Rth value. The techniques disclosed herein can also utilize biaxial films stretched both in-plane and in the thickness-direction to minimize Rth. Common polymers produce an increased refractive index when stretched (increasing Rth), though there are certain polymers that have a decreased Rth when stretched. The former can produce a negative C-Plate, and the latter a positive C-Plate. Further included are inorganic (crystalline) materials such as quartz, sapphire, lithium-niobate and the like that are alternatives to stretched films. These materials can have either positive or negative intrinsic birefringence. Some inorganic anisotropic crystals are doped in polymers to produce a specific (e.g. achromatic) wavelength-dependent retardation. C-Plates can also be fabricated using a stack of evaporated thin-film coatings.

C-Plate retarders can be fabricated using biaxially stretched retardation films or single layers of appropriately cut/polished inorganic crystals such as c-cut sapphire. It may be difficult to fabricate a stretched film with a retardation above 300 nm of Rth, so lamination of multiple layers can be done to achieve the required value. These films can be laminated in a roll-to-roll fashion using pressure-sensitive adhesives (PSAs), or solvent-bonding. C-Plate retarders can also be produced using homeotropically aligned liquid-crystal materials and cross-linkable reactive-mesogen (RM) materials. A positive C-Plate is typically formed from a homeotropic LC/RM that is homogeneous in the thickness direction. Alternatively, highly twisted LC structures can increase the average in-plane index, relative to the thickness-direction index, thus making it possible to form negative C-plate retarders. Quarter-wave (QW) retarders are conventionally produced by stretching films or aligning RMs. Dispersion-controlled single-layer retarders can mitigate the performance impact associated with retardation errors versus wavelength when making broad-band angle-filters. Similarly, engineered retarder-stacks can provide a similar function, thought the effects of Rth on performance must be managed. In monochromatic systems, it is relatively straightforward to produce a QW retarder with the optimum Re value. An exemplary QW retarder may additionally have a zero Rth value, such that circular polarization is produced at all relevant incidence angles. This can enable more isotropic angle filtering. Zero Rth can be produced when the thickness-direction refractive index is matched to the average in-plane refractive index. The techniques disclosed herein are illustrated by way of several design examples. These designs were modeled using rigorous Berreman 4×4 matrix methods which propagate the polarization vector through multi-layer anisotropic structures.

Example 1: Single-Stage Chromatic Low-Pass Filter

Consider a case in which it is desired (i.e. Item 5 above) to have an azimuth-invariant angle transmission function over the visible band. A simple form of the novel angle filter is shown in FIG. 1. It includes a linear input polarizer, a linear analyzing polarizer, a pair of crossed quarter-wave (QW) retarders (at ±45°), and a central C-Plate retarder. Near normal-incidence, the input QW retarder is responsible for generating a circular state of polarization (SOP), with the output QW retarder responsible for restoring the input linear SOP. The C-Plate retarder is responsible for introducing an incidence-angle-dependent retardation, which is zero at normal incidence and increases at a prescribed rate versus incidence angle.

C-Plate retarders have an optic-axis normal to the substrate, so at normal incidence only a single wave is generated and there is no change in the state-of polarization. When light is incident off-normal, the projected optic-axis lies in the plane of incidence with substantially no azimuth dependence. When a C-Plate is placed between parallel-polarizers with absorption-axes at 0 or 90°, the transmission for all off-normal incidence angles remains unity at these azimuth angles. This is because the optic-axis projects onto a polarizer absorption-axis and only a single wave is generated. In the ±45° azimuth, however, two substantially equal-amplitude waves are generated, where the transmitted SOP depends upon the incidence angle and retardation of the C-Plate. That is, the condition for a high-contrast null is that both the amplitude-splitting is substantially 50:50, and that the phase-difference is substantially half-wave. This describes a highly azimuth dependent configuration that may not be desirable in certain applications. The QW retarders can have the effect of reducing the azimuth-dependence of the transmission introduced by the retardation of the central C-Plate retarder, such that the transmission profile in the 0/90° azimuth is much closer to that in the ±45° azimuth.

The filter of FIG. 1 can be considered a two-beam interferometer, where the phase delay increases with incidence angle. The minimum transmission point (between parallel polarizers) occurs when the amplitudes of the two generated waves are approximately matched, and the induced retardation represents a half-wave (HW) at the design wavelength. For angles larger than this, the transmission increases and is generally oscillatory, as is typical of two-beam interferometers. Consider the case where; (a) the polarizers are ideal (zero transmission for all wavelengths along the absorption axis and substantially unity transmission along the orthogonal direction); (b) the QW's are dispersionless uniaxial quarter-wave retarders at 550 nm, and; (c) the (dispersionless, negative) C-Plate retardation is allowed to vary.

FIG. 2a illustrates the SOP after transmission through each component when light is normally incident. The LH circular SOP introduced by the polarizer/QW remains unchanged after the C-Plate. The second QW restores the input SOP and the analyzer transmits the light efficiently. FIG. 2b illustrates the case where light is introduced at critical angle $\theta_C$, where the combination of the C-Plate retardation, and the crossed QW retarders produces a HW of projected retardation. The latter refers to the fact that crossed uniaxial QW retarders contribute a QW of Rth retardation. At the critical angle, the C-Plate reverses the handedness of the circular SOP, and the second QW transmits the orthogonal linear SOP. At this angle, substantially all light is blocked by the analyzing polarizer.

The filter of FIG. 1 (and FIG. 2) can be described by a sequence of three transformations on the Poincare sphere. The first transforms light on the equator to light on (for example) the north pole. Near normal incidence, the C-Plate leaves the SOP unchanged, so the second transformation of FIG. 2a is trivial. The third transformation retraces the path of the first transformation, and all light is transmitted by the analyzing polarizer. At the critical angle (FIG. 2b), the C-Plate transforms the SOP from the north-pole to the south-pole, along a longitude path that depends upon the plane-of-incidence. The second QW transforms the SOP from the south-pole to the equator, diametrically opposite the input SOP on the Poincare sphere (i.e. orthogonal polarization).

Figure 3:
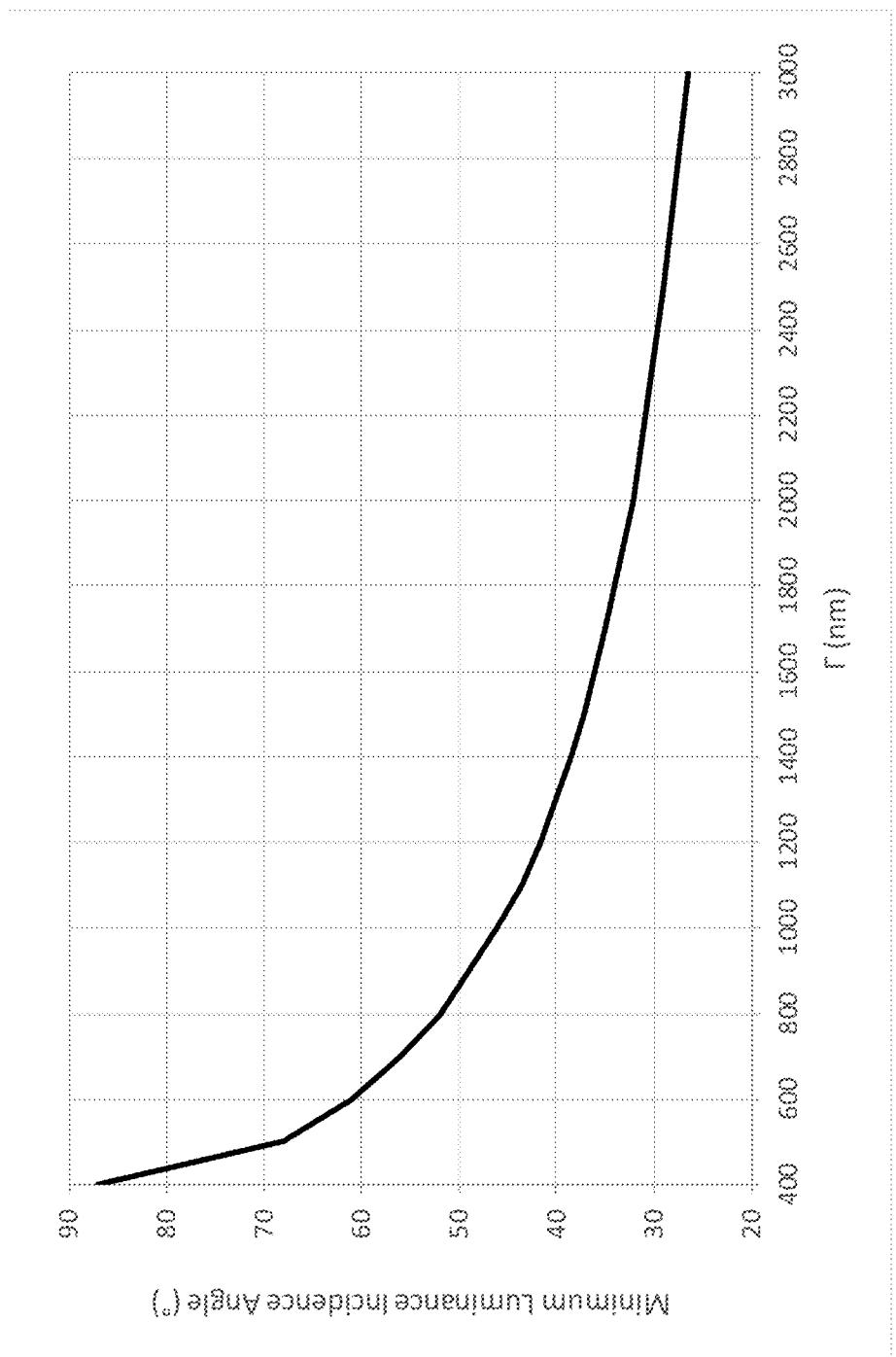
FIG. 3 shows the incidence angle at which the transmitted lumen value is minimized as a function of (negative) C-Plate retardation, $\Gamma$.

FIG. 3 shows the angle of incidence at which the photopic transmission is a minimum as a function of C-Plate retardation for the configuration of FIG. 1. Naturally, as the base C-Plate retardation is increased this angle becomes smaller. Also, no spectral transmission minimum is produced when the C-Plate retardation is too low (typically below 400 nm). The transmission shown corresponds to the photopic-minimum assuming a flat-top input spectrum. For all cases shown in the figure, the peak photopic contrast (i.e. inverse of the photopic transmission) was approximately the same, at 33:1. This contrast limitation is due to the fact that the HW retardation incidence-angle is different for each wavelength. FIG. 3 corresponds to the azimuth case where the plane of incidence is parallel/perpendicular to the absorption axis of the polarizer. While the transmission is fairly azimuth independent, there tends to be greater leakage in the ±45° azimuth due to geometric-rotation and the chromatic shift of the QW retarders.

Figure 4:
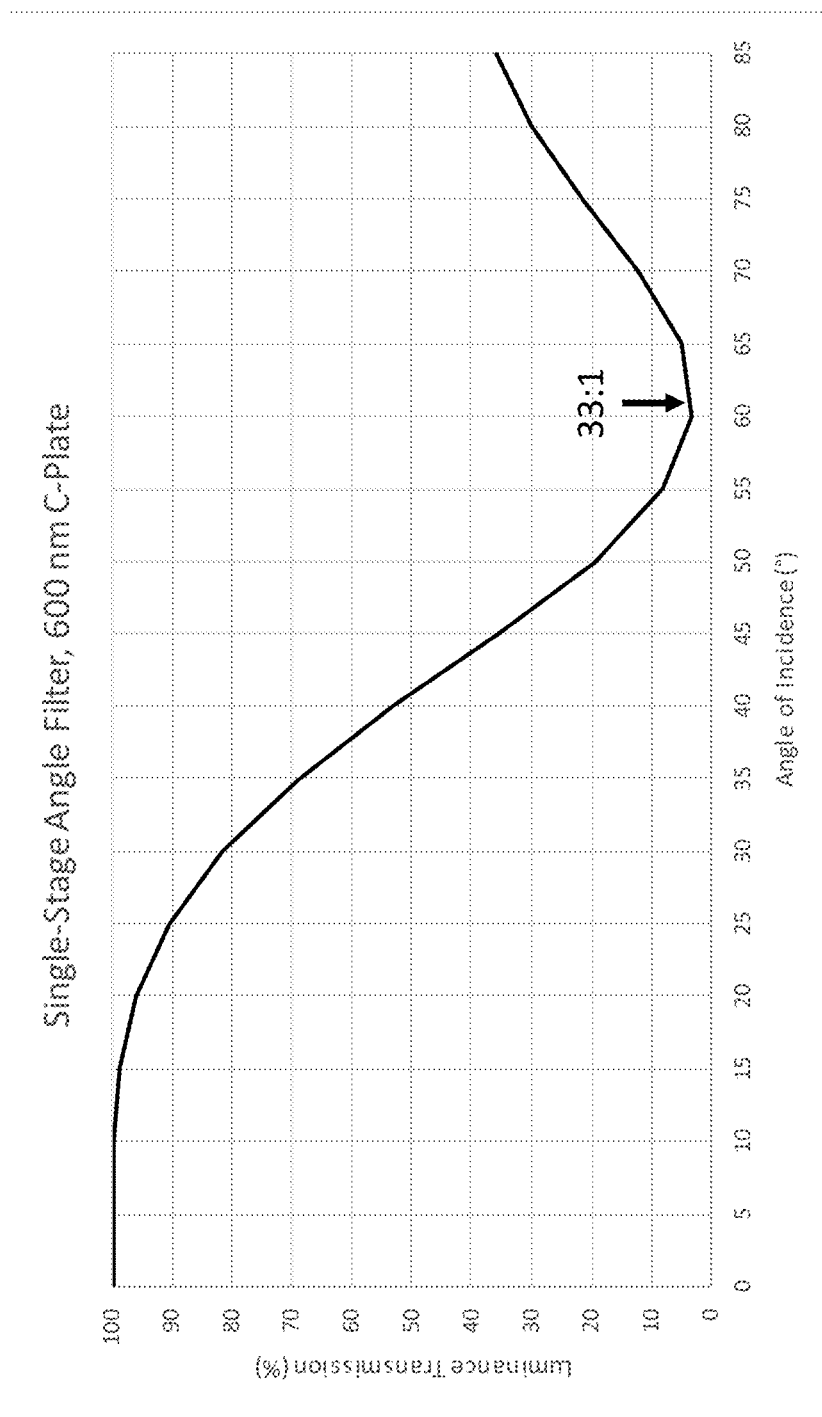
FIG. 4 shows an example angle-dependent photopic transmission function for a single-stage filter. This example is for a (negative) C-Plate retardation of 600 nm and crossed zero-order QW retarders with 138 nm of retardation.

The C-Plate pathlength-difference introduced off-normal can be substantially wavelength independent. However, the phase-retardation determines the transmission, and it is proportional to the ratio of pathlength-difference to wavelength. The result is that the angle-filter transmission profile off-normal is different for each wavelength. The wavelength-dependence is compounded if the material has significant birefringence dispersion. Color-shifts can occur off-normal that increase as the projected retardation approaches half-wave in the visible. The spectral transmission function can be considered a "sliding-minimum", that red-shifts with incidence angle. FIG. 4 shows an example photopic transmission function using a C-Plate with a pathlength difference of 600 nm. Because the density of the transmission minimum can be quite high (33:1), the transmitted color can be fairly saturated. This color shift can vary significantly over a small range of incidence angles, which can be objectionable in some applications. As discussed previously, FIG. 4 shows that the transmission increases for incidence angles greater than the critical angle.

Example 2: Single-Stage Achromatic Low-Pass Filter

There are two important aspects of making an azimuth-invariant achromatic angle-filter with the design of FIG. 1. The first is mapping between a linear SOP and a circular SOP, independent of incidence-angle and wavelength, in order to homogenize the azimuth dependence. The second is introducing phase-retardation via the C-Plate that is independent of wavelength. These objectives can be accomplished directly using single-layers of dispersion-controlled retarder material, or indirectly using stacks of more conventional retarder materials. The former refers to (e.g.) copolymers or RMs that yield a pathlength-difference that increases with wavelength, giving a phase-retardation that is more uniform over a prescribed spectral band. The latter refers to (e.g.) achromatic combinations of retarders first described by Pancharatnam that produce an effective pathlength difference that increases with wavelength. In the present instance, it can further be critical that either of these solutions behaves in a specific way when light is introduced off-normal.

For Example 2, consider the design of FIG. 2 using dispersion-controlled retarder materials. The density of the spectral minimum can be impacted by the wavelength-dependent retardation of the QW retarders. That is, perfectly achromatic QW retarders can produce a high-density spectral null at the angle-of-incidence corresponding to a HW of projected C-Plate retardation. This can increase the saturation of the transmitted color when the C-Plate is chromatic. Consider the case where the QW retarders are dispersion controlled (see Table 1), but the C-Plate has a fixed 600 nm of pathlength difference.

TABLE 1

Parameters used for achromatic angle filter model. The wavelength for the dispersion fit is in microns.

| Layer | Orientation | $n_o$ | $n_e$ | d (microns) |
|---|---|---|---|---|
| QW1 | 45° | $1.50 + 0.00006/\lambda^4$ | $1.51 - 0.00006/\lambda^4$ | 16.25 |
| -C-Plate | — | 1.51 | $1.50 + 0.0008/\lambda^2$ | 60.0 |
| QW2 | −45° | $1.50 + 0.00006/\lambda^4$ | $1.51 - 0.00006/\lambda^4$ | 16.25 |

Figure 5:
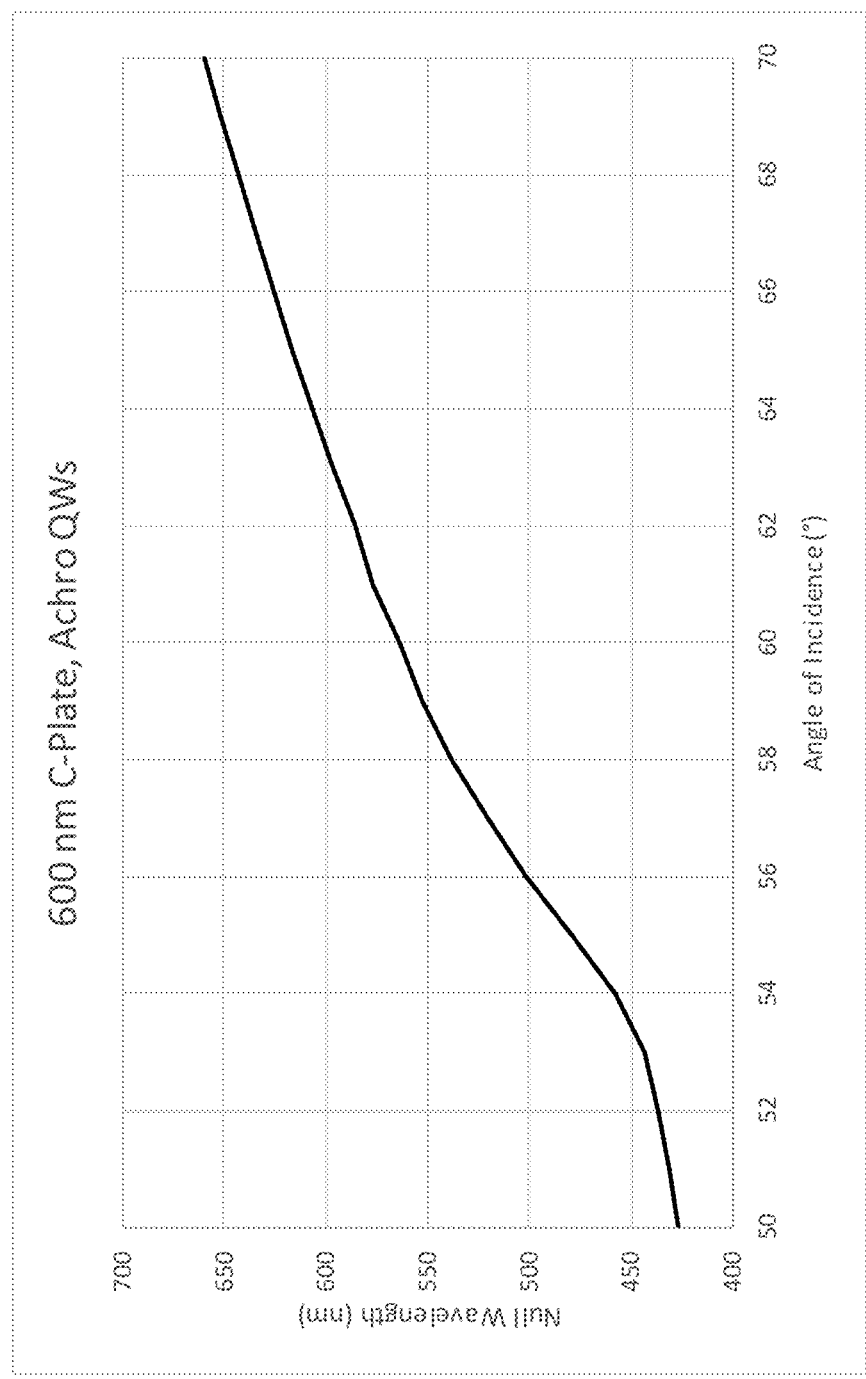
FIG. 5 shows the wavelength of minimum transmission as a function of incidence-angle using achromatic QW retarders and a 600 nm C-Plate retarder.

Using the parameters of Table 1, the QW retarders have a retardation of 0.21-waves (450 nm), 0.26-waves (550 nm), and 0.23-waves (650 nm). This fit is a close match to a commercial product offered by Teijin for rejecting backplane reflections in OLED displays. FIG. 5 shows the wavelength of minimum spectral transmission versus incidence angle. It shows that (for this C-Plate value), the null sweeps most of the visible band in a range of approximately 20°. Table 2 shows the large color-shift associated with the sliding-minimum over the same range of angles.

TABLE 2

Color coordinate versus incidence angle for the 600 nm C-Plate example.

| Angle of Incidence | x | y |
|---|---|---|
| 50° | 0.485 | 0.427 |
| 55° | 0.528 | 0.359 |
| 60° | 0.216 | 0.097 |
| 65° | 0.167 | 0.142 |
| 70° | 0.192 | 0.196 |

Figure 6:
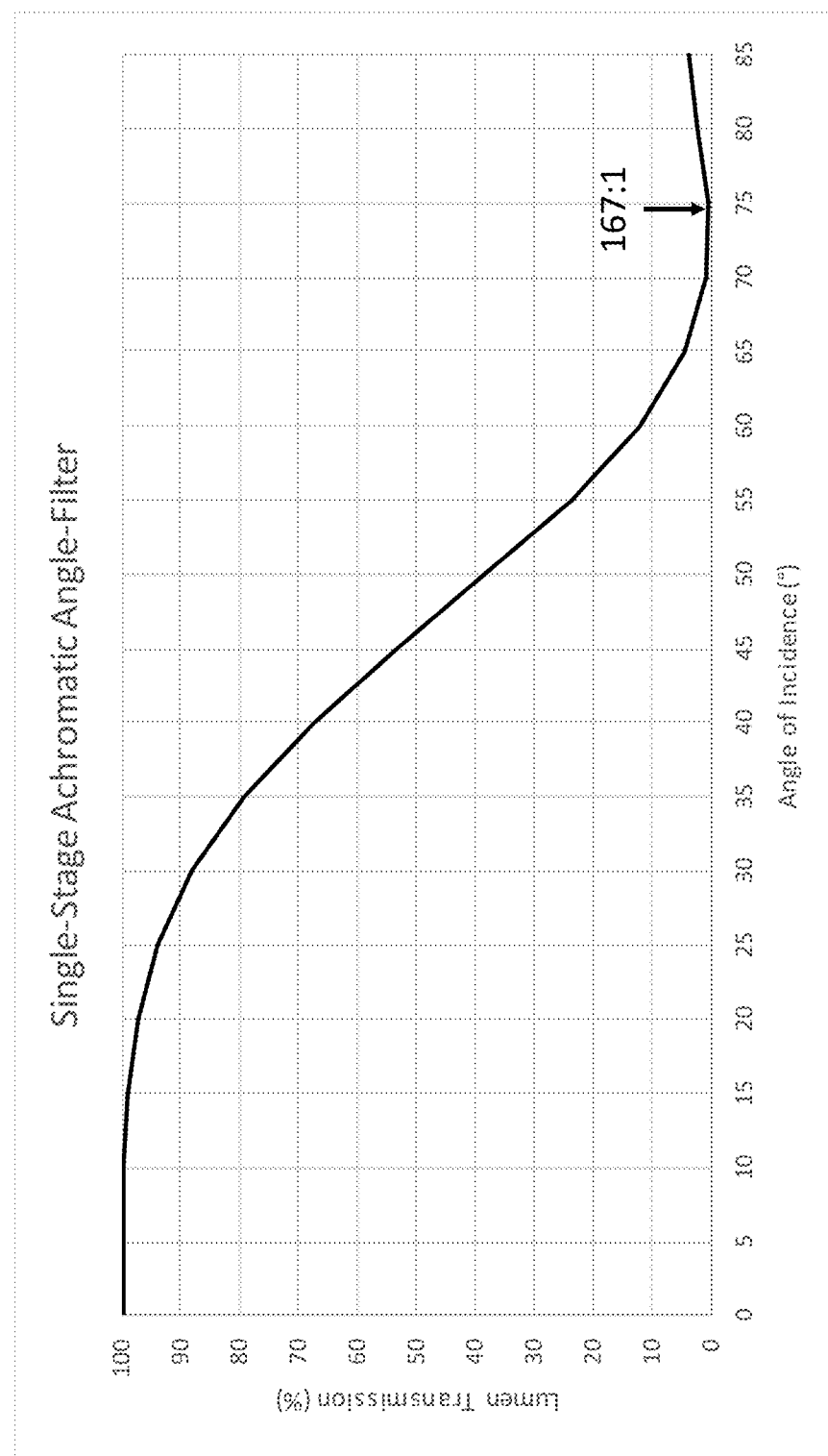
FIG. 6 shows the transmission versus incidence angle for a single-stage angle-filter using achromatic QW and achromatic C-Plate retarders.

In the event that a dispersion-controlled C-Plate is also used, the color shift can be greatly reduced. Using the parameters of Table 1, the C-Plate has a total retardation of 0.81-waves (450 nm), 0.80-waves (550 nm), and 0.75-waves (650 nm). FIG. 6 shows the lumen transmission as a function of incidence angle using the three-layer dispersion-controlled design. Because the transmission profile has much reduced wavelength-dependence, the contrast at the critical angle can be much higher. Rather than the previous 33:1, this design shows an increase to 167:1.

Example 3: Two-Stage Chromatic Low-Pass Angle-Filter

Figure 7:
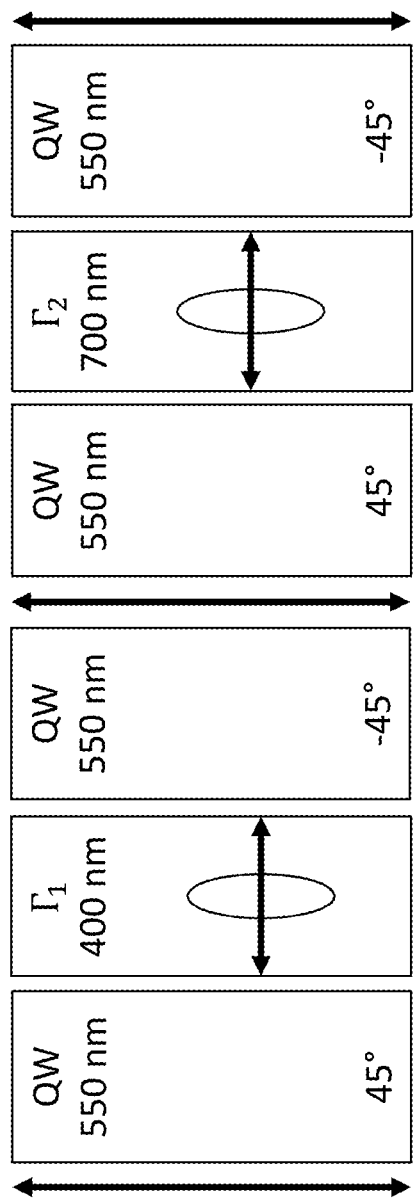
FIG. 7 shows a two-stage angle-filter, where the first stage has a C-Plate retardation $\Gamma_1$ and the second stage has a C-Plate retardation $\Gamma_2$.

The filter of FIG. 7 is useful when a particular angular transition-bandwidth is required, followed by a range of angles over which the leakage remains bounded. This filter is a two-stage device, where additional angular performance can be gained by using additional stages as required. Analogous to a (e.g., Lyot) polarization interference filter, each stage may have a distinct angular response, where the composite transmission is the product of the two stages. Alternatively, performance increases can be gained by simply using redundant stages with the same C-Plate value. Note that this version requires an additional analyzer for each additional stage. This can be a high-transmission iodine polarizer that may have internal transmission of 97-98% to minimize throughput loss. Other versions of the filter achieve a prescribed angular performance from a stack of retarders in a single stage, or hybrid multi-stage filters. Also, multi-stage filters can be realized using dispersion-controlled retarders as described in the previous example.

Figure 8:
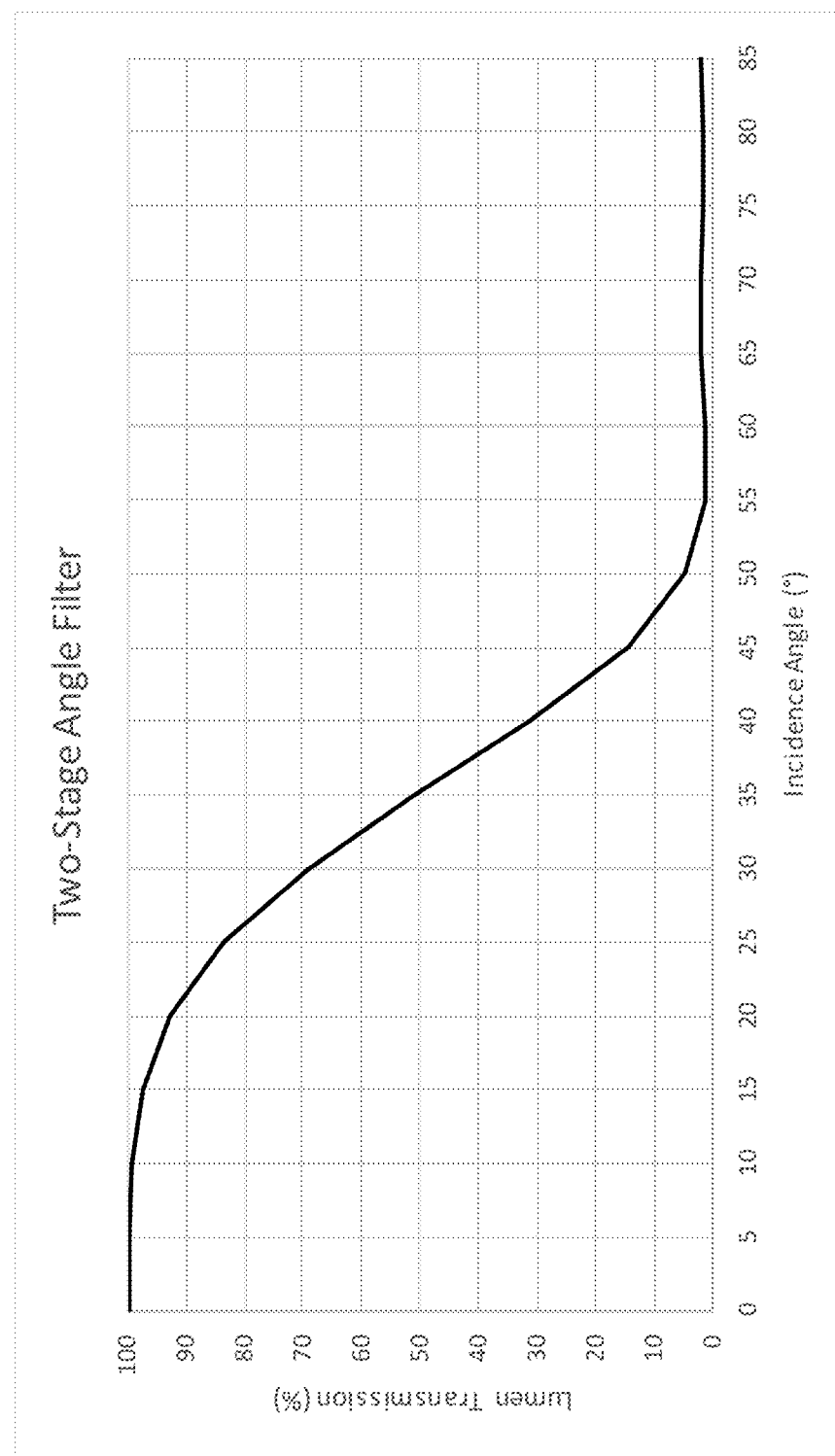
FIG. 8 shows the angle dependence of filter transmission for the design of FIG. 7, where $\Gamma_1$=400 nm and $\Gamma_2$=700 nm.

For the example of FIG. 7, one stage has a C-Plate retardation of 400 nm, with the second stage having a C-Plate retardation of 700 nm. FIG. 8 shows the photopic transmission (in the plane of the polarizer absorption axis) as a function of incidence angle.

Example 4 Single-Stage High-Contrast Monochromatic Low-Pass Angle Filter

Consider a low-pass angle filter used with a monochromatic input that is required to have a filter profile that is isotropic in azimuth space. An arbitrary wavelength (532 nm) was selected for this case. In this example, exemplary QW retarders are used with optimum 133 nm Re, and zero Rth. A negative C-Plate retardation of 700 nm was arbitrarily selected, giving a cutoff 50% angle of approximately 40°, with a null angle of approximately 60°. Because the exemplary QW retardation is maintained, the performance is in this case limited by geometric rotation issues. That is, there are azimuth angles at which the maximum contrast is reduced due to an error in the angle between the QW optic axis and the polarizer absorption axis. To correct this, a geometric compensator can be introduced in either one or both locations of the filter. This may be between the first polarizer and first QW retarder, between the second QW retarder and the second polarizer, or both. Geometric compensators (GCs) are typically used in display, particularly for correcting the leakage of crossed polarizers in in-plane-switch (IPS) mode LCDs. One version, shown in FIG. 9, is the combination of a positive A-plate (uniaxial retarder with OA in-plane), and a positive C-Plate.

Figure 9:
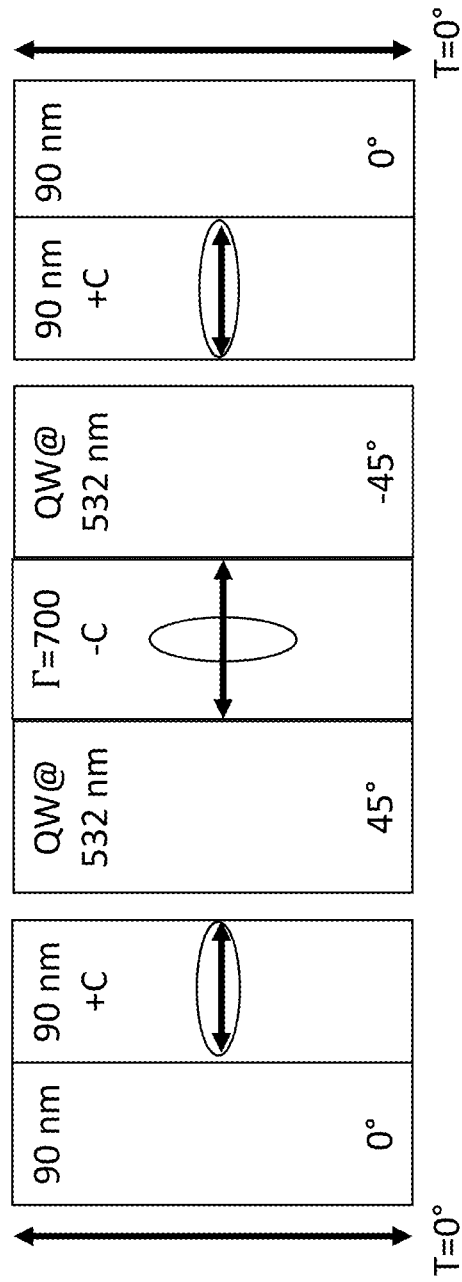
FIG. 9 shows a single-stage high-contrast monochromatic low-pass angle-filter.

The single-stage of FIG. 9 contains two GCs, each an A-Plate/C-Plate combination between each polarizer and QW. The correction it applies enables excellent null contrast at all azimuth angles, while maintaining a weak azimuth dependence of cutoff angle. Table 3 shows the model behavior for the design of FIG. 9 for a few azimuth angles. This coarse sampling of azimuth is sufficient due to the fact that the filter profile has a very smooth behavior. Table 3 shows that the 50% point is maintained to within 1° over the full azimuth. It also shows that the null point is maintained to within 1.7° over the azimuth, and that the contrast of the null is maintained to at least 10,000:1. As shown in previous examples, the transmission again rises for angles larger than the critical angle. In the event that a broader coverage of the stop-band is required, a two (or more) stage version can be used. Additionally, if the filter is required to operate over a broad range of wavelengths (e.g. >30 nm), it is possible that dispersion-control of the QW retarders, and perhaps the C-Plate, is needed.

TABLE 3

Performance of the FIG. 9 design at a few azimuth angles.

| Azimuth | AOI (50% Transmission) | AOI (null) | Null Transmission (%) |
|---|---|---|---|
| 0° | 39.2° | 58.5° | 0.00 |
| 15° | 39.5° | 59.2° | 0.00 |
| 30° | 40.0° | 60.2° | 0.01 |
| 45° | 40.2° | 60.2° | 0.00 |
| 60° | 39.8° | 59.4° | 0.01 |
| 75° | 39.4° | 58.7° | 0.01 |
| 90° | 39.2° | 58.5° | 0.00 |

Example 5 Two-Stage High-Contrast Monochromatic Low-Pass Angle-Filter

Figure 10:
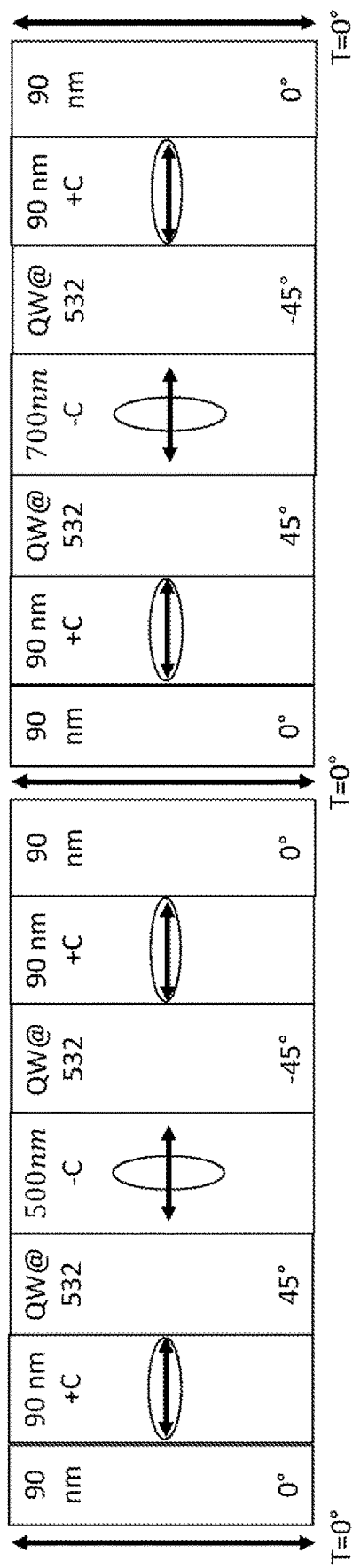
FIG. 10 shows a two-stage high-contrast monochromatic low-pass angle-filter.
Figure 11:
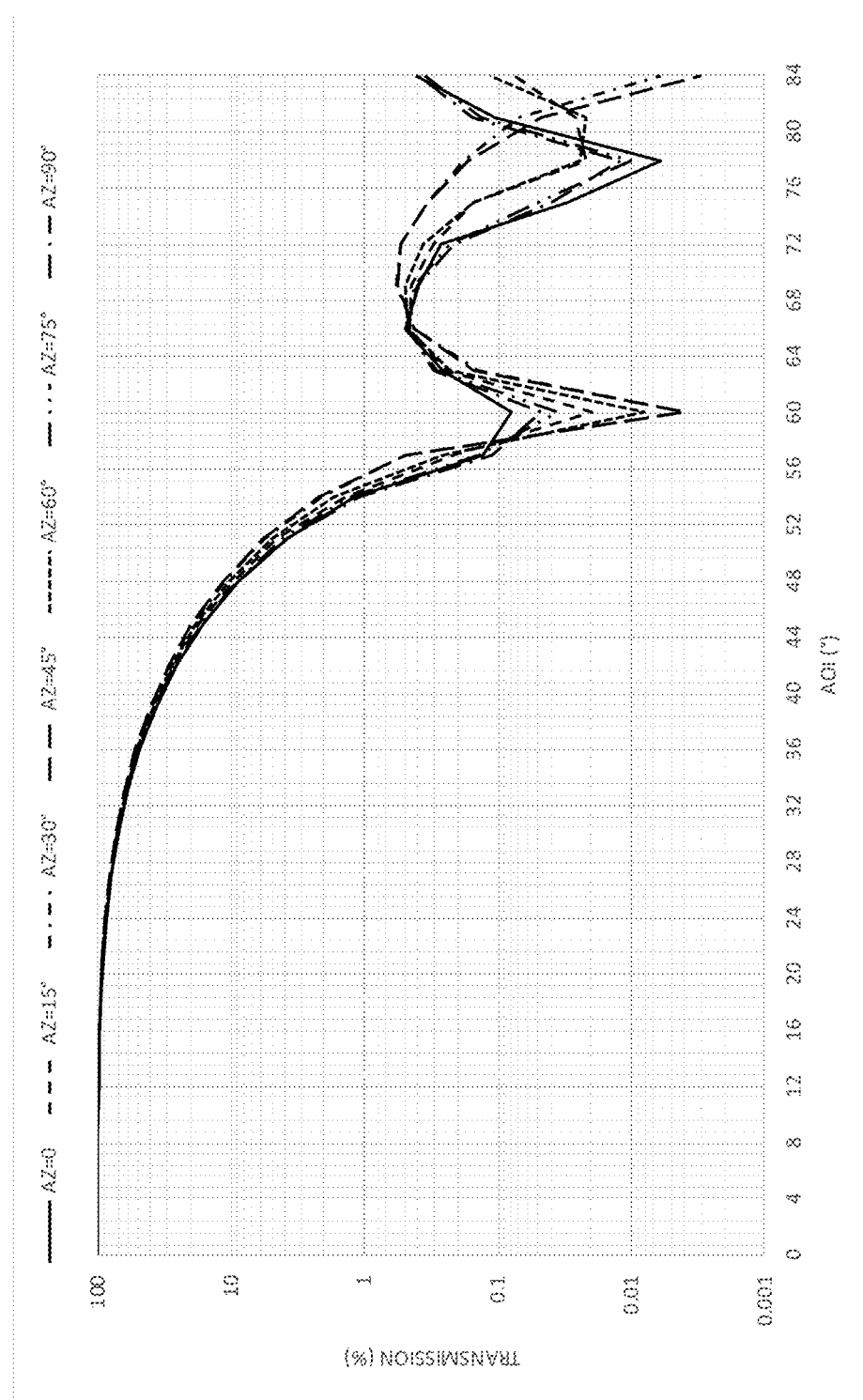
FIG. 11 shows the transmission versus incidence-angle for a two-stage high-contrast monochromatic low-pass angle-filter for select values of azimuth.

FIG. 10 shows a two-stage angle filter, using the design principles of the previous example. In this case, the stages are identical in construction, except that the C-Plate retardation is 500 nm in the first stage, and 700 nm in the second stage. As before, results are shown for an input wavelength of 532 nm. FIG. 11 gives the log-scale transmission function, showing that the product of the two stages can produce two high-contrast nulls. Using this selection of C-Plate values, the side-lobe between these nulls is maintained to approximately 200:1. Were a third stage added, there would be an additional null available that could be used to increase angle-coverage, increase rejection, or some combination of each. FIG. 11 shows several traces corresponding to azimuth angles in 15° increments. As in the single-stage case, the two-stage filter shows excellent azimuth invariance.

Example 6 Single-Stage Monochromatic Band-Pass Angle-Filter

Figure 12:
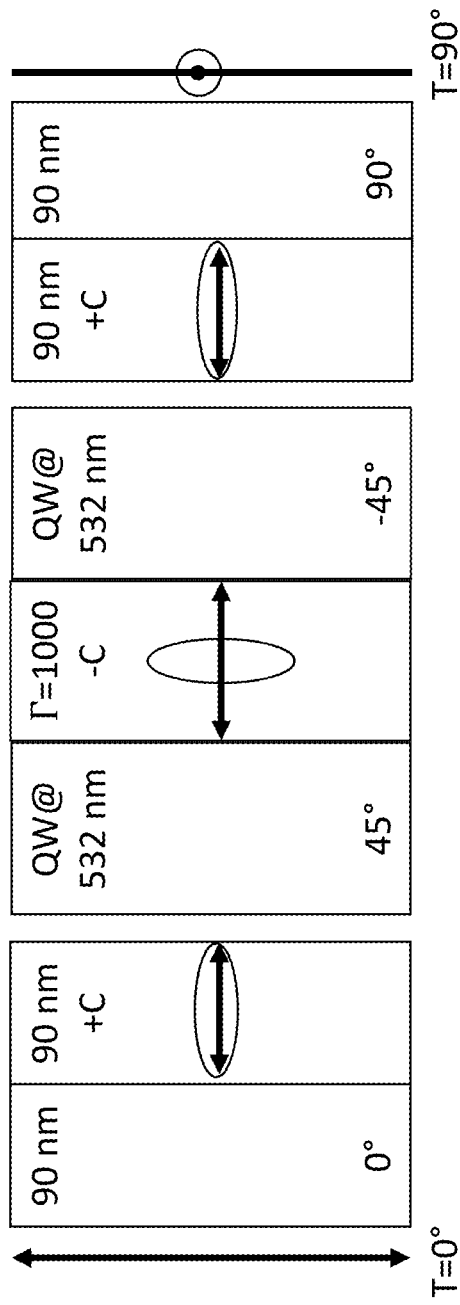
FIG. 12 shows a single-stage high-contrast monochromatic band-pass angle-filter.
Figure 13:
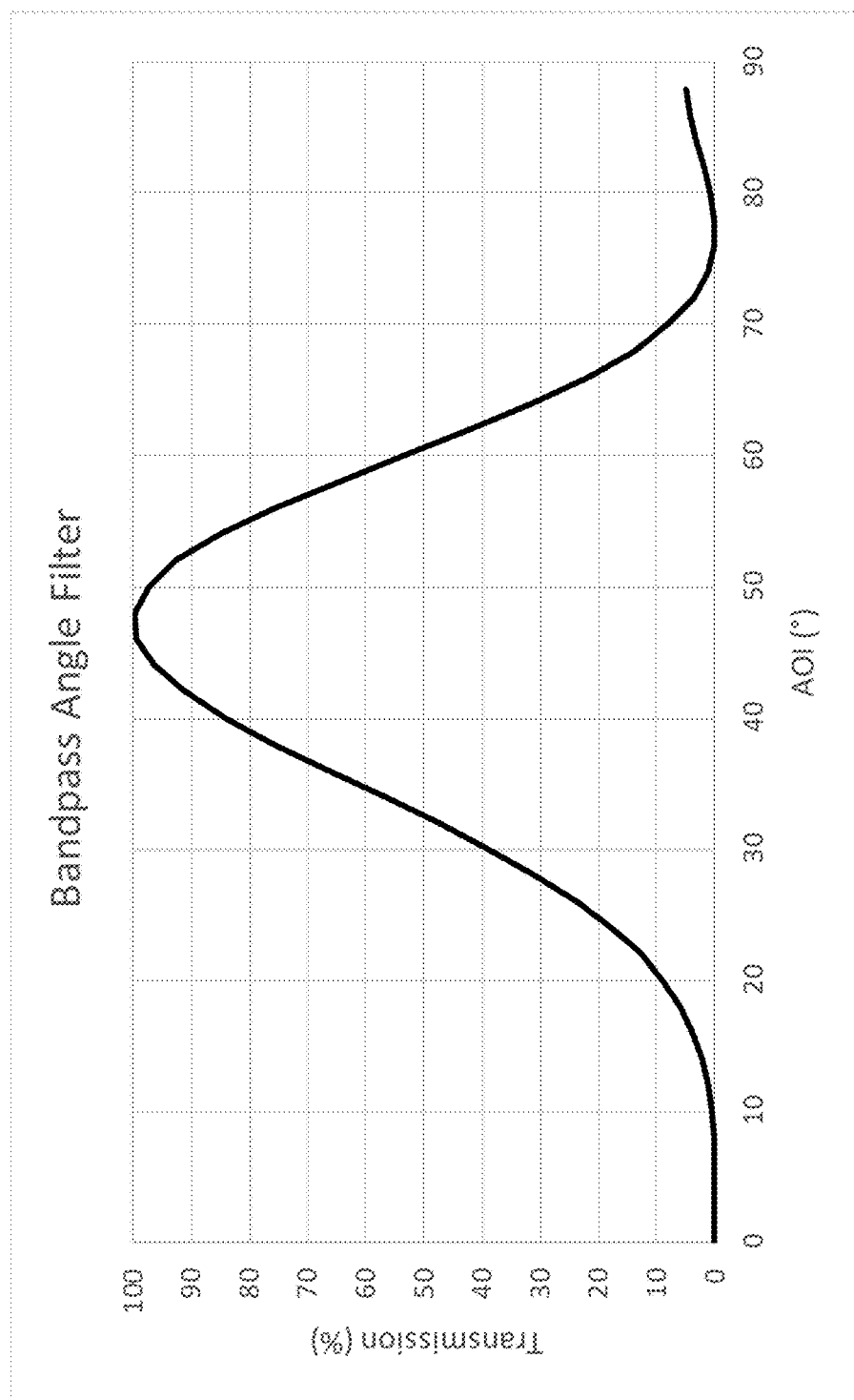
FIG. 13 shows the transmission versus incidence-angle for a single-stage monochromatic band-pass angle-filter for the zero-azimuth.

The novel angle-filters need not be confined to low-pass configurations. Other configurations, such as band-pass, high-pass, and band-stop filters are also enabled. In Example 6, a single-stage band-pass angle-filter is formed by a modification to the arrangement of FIG. 9. The modified configuration is shown in FIG. 12, where the analyzing polarizer (along with adjacent geometric compensator) is rotated by 90°, and the C-Plate retardation is increased to 1,000 nm. As in Example 6, the contrast polar-plot remains azimuth-invariant, so only a single azimuth angle is shown in FIG. 13. The donut transmission profile shows zero transmission at normal-incidence, full transmission at 49°, with another stop band centered at 78°. As before, further refinements can be made by adding additional stages. For example, the selectivity can be increased by adding a higher resolution stage that also peaks at 49°, but with a narrower profile. Additional transmission peaks of the higher resolution stage are inconsequential so long as they coincide with nulls of the lower resolution stage. In another version of the filter, a high-pass configuration can be realized by decreasing the C-Plate retardation. Again, further refinement can be achieved by using one or more additional stages.

Other Configurations

There are other ways in which azimuth invariance can be achieved in the contrast polar-plot. In the event that a particular stage has an azimuth-dependence to the transmission profile, it can be paired with another stage having similar azimuth dependence, but with a displacement (e.g. a 45° rotation). In one configuration of a two-stage angle-filter, the geometric-compensator introduces an azimuth-dependent Rth that distorts the polar-plot from a quasi-circular profile to one that is more rectangular. A second geometric compensator can create a similarly distorted rectangular polar-plot which is rotated by approximately 45°. The system polar plot is given by the product of the polar plot from each stage. This arrangement can have the benefit that a single C-Plate retardation can be used in both stages to expand the angular coverage of rejection while homogenizing the azimuth-dependence. Specifically, the product of the two stages can create a polar-plot with quasi azimuth-invariance, but which can also have the selectivity benefits of a two-stage filter.

The configuration of FIG. 1 can be modified to accommodate specific input/output polarizations. For instance, a similar angular response can be obtained if the QW retarders have parallel optic axes and the polarizers are crossed. A reflection-mode version of a band-pass/high-pass angle-filter can be realized using a QW retarder, followed by a C-Plate retarder, followed by a reflector. Additionally, the QW retarders can be omitted if the system already operates on a circular polarization basis. Certain optical components, often with a chirality (e.g. cholesteric liquid crystals and Bragg polarization gratings) can have circular eigenpolarizations.

In the event that more azimuthal control of the transmission function is required (e.g. asymmetric function of azimuth), the C-Plate retarder can be replaced with one or more O-Plate retarders. An O-Plate has an optic-axis that is intermediate (i.e. at an angle that is neither in-plane, nor normal to the substrate). The O-Plate can have the characteristic of greater angle-dependence near normal incidence. O-Plates can be fabricated via cutting a crystal at a specific inclined angle, or (e.g.) via aligning a liquid crystal polymer at a specific angle with respect to normal.

In the configuration of FIG. 1, the C-Plate can be replaced with the combination of an A-Plate (in-plane uniaxial) and an O-Plate. The A-Plate retardation can be matched to the projected retardation of the O-Plate at normal incidence giving no change in the SOP at normal-incidence. However, the projected retardation of the O-Plate can change rapidly with incidence angle, which is maximum when the inclination angle of the optic-axis is ±45°. In this case, the composite in-plane retardation is zero at normal incidence when the A-Plate has half of the total retardation of the O-Plate. This configuration gives a first-order retardation shift, versus the second order retardation shift associated with a C-Plate near normal incidence. The retardation shift of this configuration is also asymmetric in azimuth.

Angle-filters, such as those taught herein, can be used in any optical system that benefits from an angle-of-incidence dependent transmission or reflection function. A benefit of these techniques is that optical-quality can be preserved when the component is placed in an image path. This can be contrasted with structured light-control films that can introduce ghost images and other artifacts. Examples of the latter can include arrays of total-internal-reflection prisms, light-guiding structures, and volume holograms.

Figure 14:
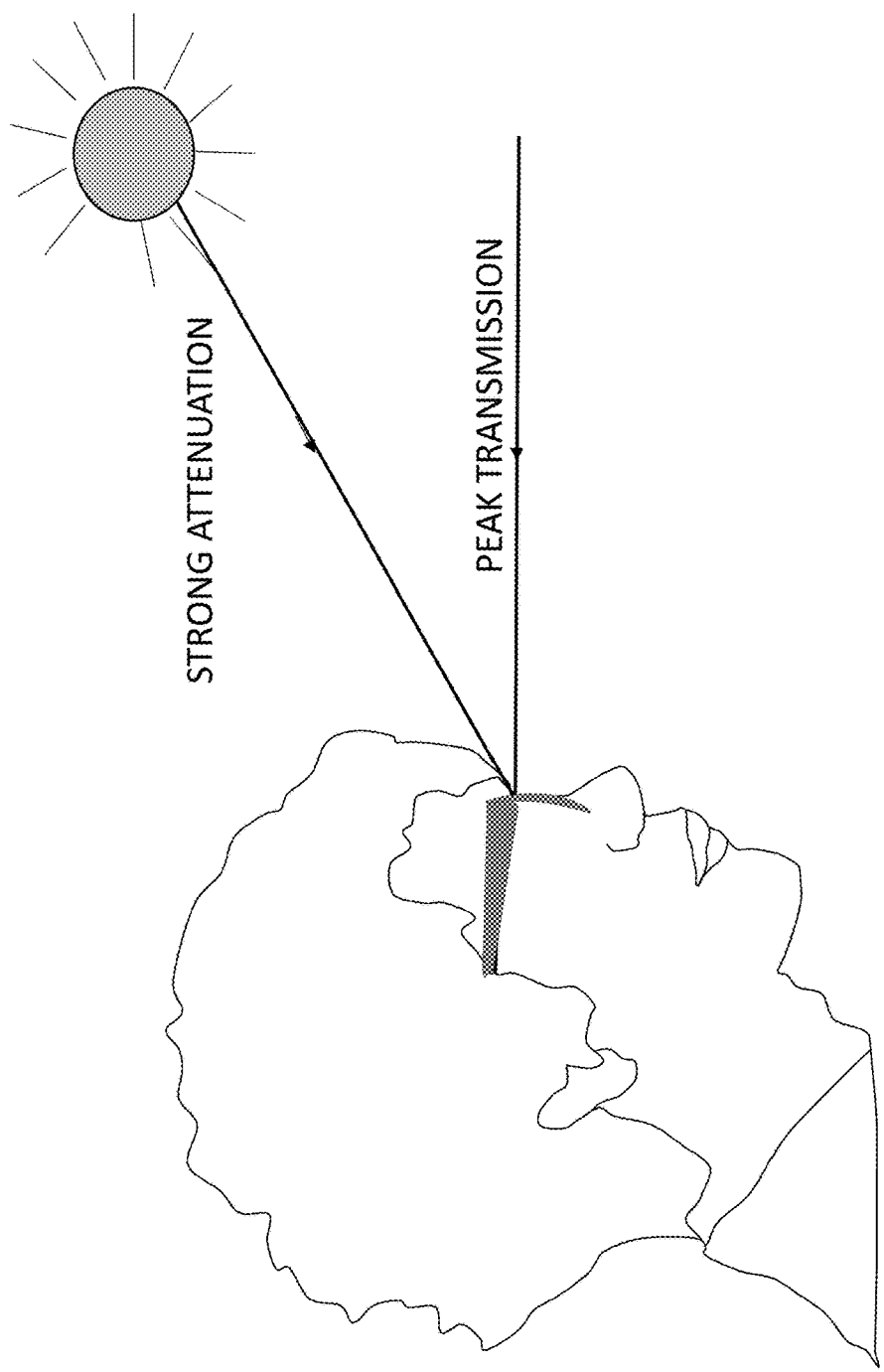
FIG. 14 shows the use of the angle-filter in eyewear for improving the quality of viewing in bright conditions.

Applications for the novel angle-filter are numerous; involving systems that can operate in any optical band (UV to infrared). The optical system may involve imaging, or it may be associated with radiometric systems (e.g. decreasing the etendue of an illumination source) or limiting the etendue of a receiver. The optical systems vary from (e.g.) devices placed in front of the eye to improve real-world image quality as well as synthetic imagery such as virtual reality systems. Angle-filters can be used in near-eye applications such as sunglasses (e.g. as a replacement for gradient coatings) for reducing excessive directional light (e.g. from the sun/sky). An example, illustrated in FIG. 14, is a pair of sunglasses or a clip-on accessory that can substantially reduce the transmission of rays that lie outside of the view-cone. A gradual taper in transmission can be visually unnoticeable, yet the attenuation can substantially reduce (e.g.) directional illumination light that contributes to stray-light fatigue and discomfort. This represents an alternative to gradient reflective/absorptive coatings used in prior-art sunglasses which rely on a correspondence between lens position and angle-of-arrival of incident light. Uniquely, the techniques disclosed herein are spatially invariant and attenuate light solely on the basis of angle-of-arrival.

Figure 15:
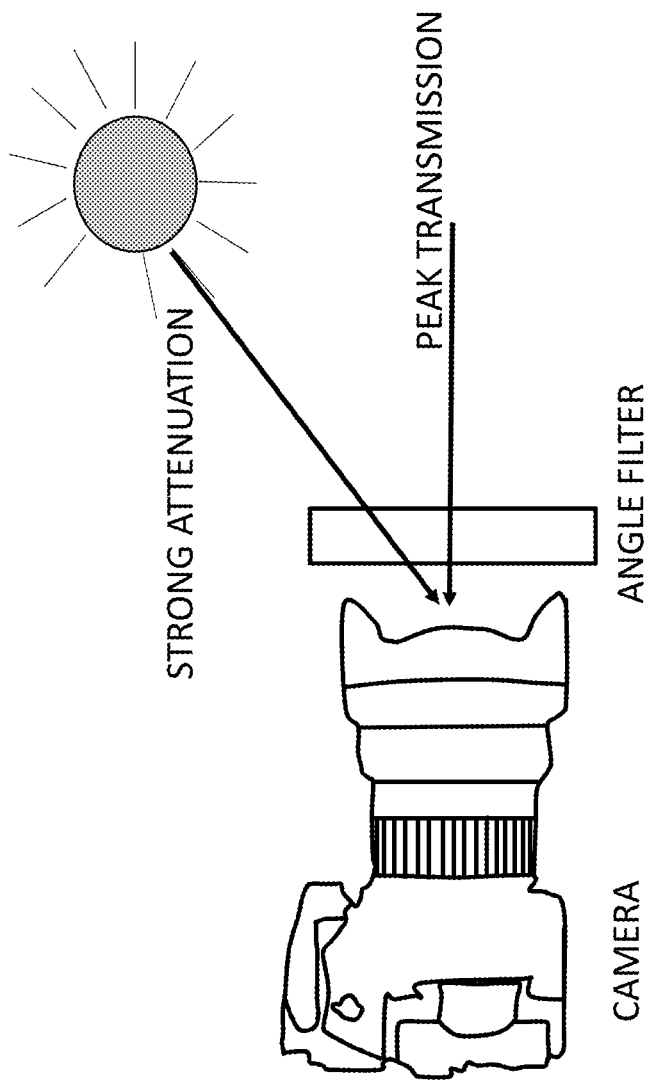
FIG. 15 shows the use of the angle-filter for tapering the transmission of light within the acceptance angle of a camera lens.

Another application is in image capture, as illustrated in FIG. 15. A camera (e.g. DSLR, mobile-phone, or cinema camera) utilizes multi-element lenses for forming a high-quality image on the CMOS sensor. In some cases, devices such as hoods or gradient-index coatings are placed at the input of a lens to block directional light that creates artifacts, such as flares. The novel angle-filter can be placed in various locations of the optical train to accomplish a similar function, but with spatial-invariance.

Figure 16:
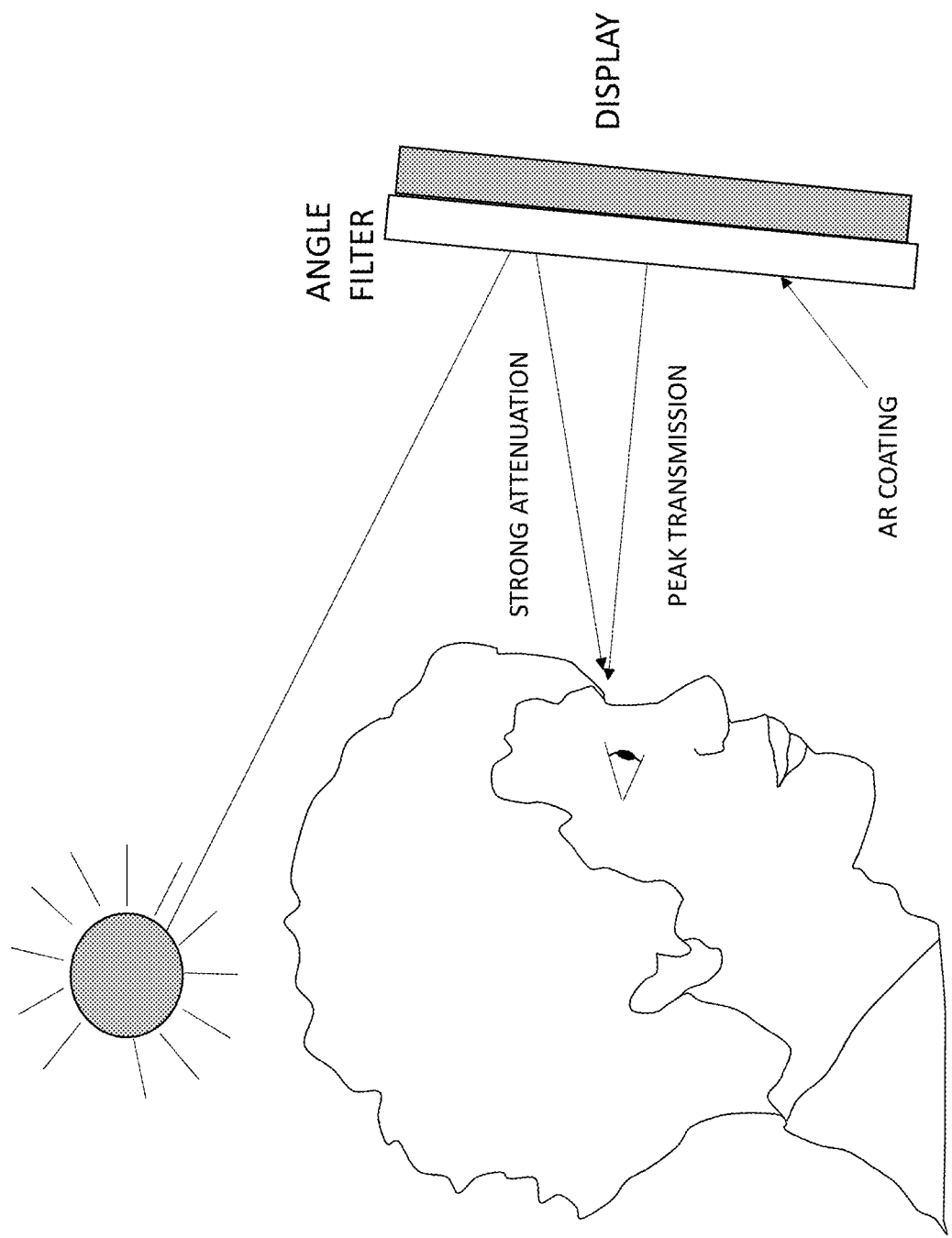
FIG. 16 shows the use of the angle-filter on a display device for improving the quality of viewing in bright conditions.

Another application is in displays, such as mobile-phones, mobile computing devices, desktop monitors, and televisions. Ambient light is often a performance limiter with bright directional lighting specularly reflects from the surface of the display device. FIG. 16 shows an angle-filter between a viewer and a display device. In organic light-emitting diode (OLED) displays, for example, a circular polarizer (polarizer followed by a broad-band quarter-wave retarder) is frequently placed above the display to extinguish ambient light specularly reflected from the back-plane. However, the performance of CPs can falter at large angles-of-incidence, causing leakage that reduces contrast. The angle filter is shown with a broad-band antireflection coating on the first surface. The insertion loss of the angle-filter can be quite low, as it involves adding only one additional polarizer to the display. As such, display light is efficiently transmitted through the angle-filter with a designed taper function per the viewing angle requirements. Ambient light that specularly reflects from the backplane makes two passes of the angle-filter, squaring the transmission function and improving rejection relative to image light.

Figure 17:
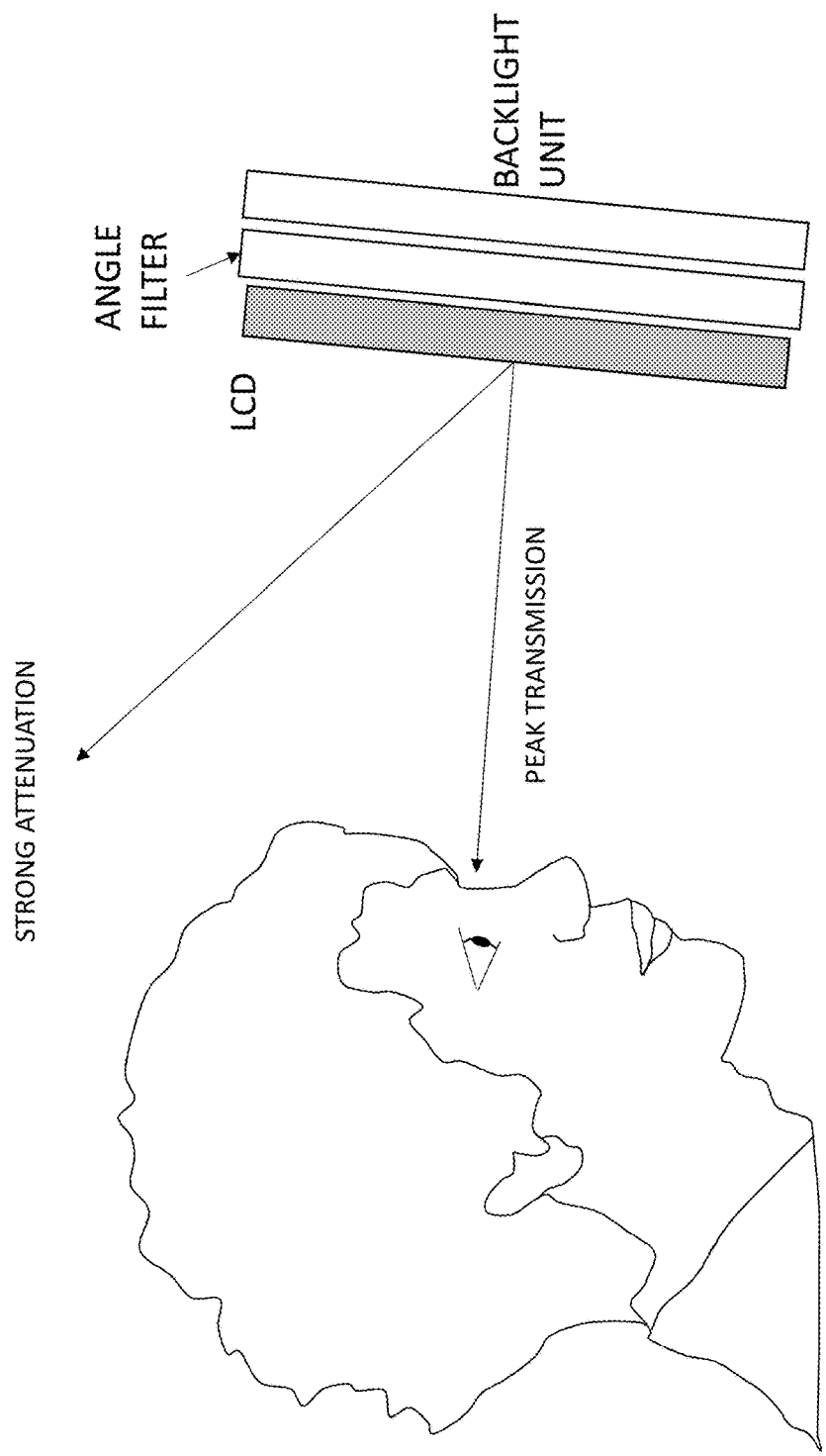
FIG. 17 shows the use of the angle-filter for tapering the transmission of emission light from a display device.

FIG. 17 shows the use of the angle filter between a display (e.g. an LCD) and a backlight unit. The backlight unit may have a broad-angle (Lambertian-like) emission, while the viewer may require a much smaller emission angle. The angle-filter can taper the emission such that the viewer receives imagery with adequate brightness and uniformity, while light emitted outside of this range is strongly attenuated.

The invention claimed is:

1. An angle-filter, comprising:
exactly two polarizers that function as circular polarizers along a same light beam path, comprising:
an input circular polarizer; and
an analyzing circular polarizer; and a retarder positioned between the circular polarizers, the retarder having a thickness-direction retardation;

wherein the thickness-direction retardation of the retarder (R1h) is selected to produce a prescribed angle-of-incidence dependent transmission function, and wherein the circular polarizers reduce the amount of azimuth-dependence in the transmission function.

2. An angle-filter as defined in claim 1, wherein the retarder has R1h<0 or R1h>0.

3. A pair of eyewear containing an angle-filter as defined in claim 1, wherein the angle-filter has a prescribed angle-dependent transmission function reducing the amount of stray-light.

4. An image-capture device containing an angle-filter as defined in claim 1, wherein the angle-filter has a prescribed angle-dependent transmission function for reducing the amount of stray-light.

5. A display device containing an angle-filter as defined in claim 1, wherein the angle-filter has a prescribed angle-dependent transmission function for reducing the amount of stray-light reflected by the display, reduces the etendue of the backlight unit, or both.

6. A radiometric system, wherein an angle-filter as defined in claim 1 is placed in a receiver-path, an illumination-path, or both, for the purpose of reducing the etendue.

7. An angle-filter as defined in claim 1, wherein the retarder is one of a C-Plate, an O-Plate, or a Biaxial retarder.

8. An angle-filter as defined in claim 7, wherein the retarder is a C-Plate with magnitude |Rth|>400 nm.

9. An angle-filter as defined in claim 1, wherein the transmission function is one of a low-pass filter, a band-pass filter, or a high-pass filter.

10. An angle-filter as defined in claim 9, wherein the azimuth variation in a 50% transmission angle varies by less than ±10%.

11. An angle-filter as defined in claim 9, wherein the azimuth variation in a 50% transmission angle varies by less than ±20%.

12. An angle-filter as defined in claim 1, wherein the circular polarizers are each constructed of a linear-polarizer combined with a quarter-wave retarder.

13. An angle-filter as defined in claim 12, wherein each of the linear polarizer are one of an absorptive polarizer, a reflective polarizer, or a crystalline polarizer.

14. An angle-filter as defined in claim 12, wherein the analyzing circular polarizer is the input circular polarizer flipped about the polarizer axis.

15. An angle-filter as defined in claim 12, wherein the quarter-wave retarders have reverse-dispersion, such that the optical-pathlength-difference in the red exceeds that in the blue.

16. An angle-filter as defined in claim 12, wherein the quarter-wave retarders have R1h<Re/2.

17. An angle-filter as defined in claim 12, wherein the quarter-wave retarders have R1h=0.

18. An angle-filter as defined in claim 12, wherein the polarizers are parallel, and the QW optic-axes are crossed at ±45°.

19. An angle-filter as defined in claim 12, wherein the quarter-wave retarders are one of a stretched polymer, a reactive-mesogen retarder, or a crystalline retarder.

20. An angle-filter as defined in claim 12, wherein a geometric compensator is placed between the input linear-polarizer and the quarter-wave retarder, between the analyzing linear-polarizer and quarter-wave retarder, or between both.

21. A two-stage angle-filter arranged in series, comprising:
exactly four circular polarizers;
a first stage, comprising:
two of the four circular polarizers, comprising:
a first input circular polarizer; and
a first analyzing circular polarizer; and
a first retarder between the first circular polarizers;
a second stage, comprising:
two of the four circular polarizers, comprising:
a second input circular polarizer; and
a second analyzing circular polarizer; and
a second retarder between the second circular polarizers;
wherein the thickness-direction retardation of the first retarder (R1h I) and of the second retarder (R1h2) are selected to produce a prescribed angle-of-incidence dependent transmission function, and
wherein the circular polarizers reduce the amount of azimuth-dependence in the transmission function.

22. An angle-filter as defined in claim 21, wherein the transmission function is one of a low-pass filter, a band-pass filter, or a high-pass filter.

23. An angle-filter as defined in claim 21, wherein the azimuth variation in a 50% transmission angle varies by less than ±10%.

24. An angle-filter as defined in claim 21, wherein the azimuth variation in a 50% transmission angle varies by less than ±20%.

25. An angle-filter as defined in claim 21, wherein the retarders are one of a C-Plate, an O-Plate, or a Biaxial retarder.

26. An angle-filter as defined in claim 25, wherein the first retarder and the second retarder are C-Plates with magnitude |Rth|>400 nm.

27. An angle-filter as defined in claim 21, wherein the circular polarizers are constructed of a linear-polarizer combined with a quarter-wave retarder.

28. An angle-filter as defined in claim 27, wherein a geometric compensator is placed between the input linear-polarizer and the quarter-wave retarder, the analyzing linear-polarizer and quarter-wave retarder, or both, in one or both stages.

29. An angle-filter as defined in claim 27, wherein the analyzing circular polarizer of the first stage and the input circular polarizer of the second stage share a common linear polarizer.

30. An angle-filter as defined in claim 29, wherein the polarizers are all parallel, and the QW optic-axes in the first and second stage are crossed at ±45°.

* * * * *